3,443,998
**FUEL CELL WITH Pt-Au ANODE AND MOLYB-
DATE-CONTAINING ELECTROLYTE**
Joseph A. Shropshire, Westfield, N.J., assignor to Esso
Research and Engineering Company, a corporation of
Delaware
No Drawing. Filed July 5, 1963, Ser. No. 293,155
Int. Cl. H01m 27/10
U.S. Cl. 136—86                                    4 Claims This invention relates to the conversion of chemical energy to electrical energy. In particular this invention relates to a novel fuel cell system comprising an electrode and an electrolyte in combination. More particularly, this invention relates to a Pt-gold anode catalyst in conjunction with an electrolyte comprising a molybdate dissolved in sulfuric acid.

The term fuel cell as used herein and in the art, defines a device, system, or apparatus wherein chemical energy of a combustible fuel is converted to electrical energy at a nonsacrificial or inert electrode. The true fuel cell is adapted for continuous use and is supplied with both fuel and oxidant sources outside the cell proper. Such cells include at least two electrodes. One of such electrodes will function as an anode and the other will function as a cathode. The electrodes are separated by an electrolyte which provides for ionic conductance between said anode and cathode. The electrodes are in electrical communication by conduction means external to the electrolyte. The fuel cell is fitted with means for admitting fluid oxidant into contact with cathode and means for removing products, such as $CO_2$ and water formed during the reaction, from the fuel cell. Where necessary or desired, the electrolyte compartment can be divided into an anolyte chamber and a catholyte chamber by an ion-permeable partition or ion-exchange membrane. Thus, in such cells a fuel is oxidized at the anode giving up electrons and an oxidant is reduced at the cathode upon receiving the electrons which were given up at the anode.

It is an object of this invention to provide a novel electrode-electrolyte system comprising a platinum-gold electrode in combination with an electrolyte comprising sulfuric acid with a soluble molybdate dissolved therein. This and other objects of this invention will be apparent from the description hereinafter set forth.

The production of electrical energy from chemical energy has generally been accomplished in either of 2 methods heretofore. One method has been to use high temperature as a means for increasing the speed of the anodic oxidation of chemical compounds to produce carbon dioxide and an excess of electrons such electrons being used to do useful work as electrical energy. The use of a high temperature cell has certain inconveniences of operation and the art has been searching for means to accomplish the anodic oxidation at lower temperatures. In order to effect anodic oxidation at lower temperatures catalysts were required. Efficiency of such catalysts is measured by the extent the electrode utilizing the particular catalyst is polarized. The higher this polarization the less efficient the catalyst in that a large part of the useful energy is used up in this polarization. Those skilled in the art, have therefore been searching for a catalyst that could afford low polarization in order to effect a more efficient system. A number of metals have been found to be useful depending upon the nature of the electrolyte used. In the cells employing an acidic electrolyte, metals which are not attacked by the electrolyte are required. Such requirement has essentially limited the choice of metals to the noble metals.

It has now been found that a highly efficient system, that is, one having a low polarization, can effectively be produced by using a particular bi-metallic catalyst on an electrode in conjunction with a particular electrolyte. The electrode of this invention comprises an electrically conductive substrate having a catalyst comprising a physical mixture of Pt and gold powder of small particle size impressed thereon. The substrate of this invention can be any of the known substrates presently used for electrodes in fuel cells such as a carbon body, metal clad membrane, or metal screens. The amount of the platinum-gold catalyst impressed upon the electrically conductive substrate can vary from about 2 to about 80 g./ft.$^2$ of substrate. The lower values are preferred since they are more economical. The gold and Pt-powders for use in this invention are obtained by the reduction of the metal from a solution of its salts by using a strong chemical reducing agent such as an alkali metal borohydride, alkyl silane or a trialkyl metal hydride, $H_2$ etc. The fine powders of Pt and gold are intimately mixed and then pressed into the electrically conductive substrate at pressures of about 900 to 1200 p.s.i. to form the electrode. The percent of gold in the mixture is from 30 to 70 wt. percent, preferably from 45 to 55 wt. percent.

The electrode of this invention is used in conjunction with an electrolyte consisting of aqueous sulfuric acid with a soluble molybdate dissolved therein. The sulfuric acid that can be used is an aqueous concentration of about 25 to 45 wt. percent. The concentration of molybdate in the aqueous sulfuric acid can be from about 0.1 to 2.5 wt. percent.

The well known fuel sources that can be effectively utilized to produce electrical energy are oxygenated hydrocarbons such as formaldehyde, methanol, formic acid, glycols, pentenes, butenes, propene, and hexene, other fuels such as those set forth in U.S. Patent 2,925,454 and U.S. Patent 2,384,463 can also effectively be oxidized by this system. This invention may be advantageously practiced with any fluid fuel suitable for use in conventional fuel cells employing aqueous acid electrolytes.

The soluble molybdates which can be used in the practice of this invention include molybdenum trioxide, alkali metal molybdates such as sodium molybdate, potassium molybdate and ammonium molybdate, other water soluble molybdates can also be used.

The invention will be more easily understood from the following example which is for the purpose of illustration only and should not be construed as a limitation upon the scope of the invention as set forth in the claims:

Example

An electrode was prepared by the method of this invention by pressing an intimate mixture of approximately equal quantities of Pt and Au powders on to a platinum screen at a pressure of about 1,000 p.s.i. The powders of the two metals were produced separately by adding an aqueous solution of the metal salts to an aqueous solution of $NaBH_4$. This electrode was operated in a fuel cell using 1 mole per liter formaldehyde as the fuel and 30 wt. percent sulfuric acid having 1 wt. percent sodium molybdate dissolved therein as an electrolyte. The system was also tested by using 2 wt. percent of the molybdate dissolved in the electrolyte. The efficiency of this system was compared to that of a conventional system utilizing 30 wt. percent sulfuric acid as the electrolyte and Pt as the catalyst material and to a system of using just the soluble molybdate in the electrolyte but not in combination with the Pt-Au electrode. Results of these tests are set forth in Table I.

TABLE I

| Fuel | Catalyst | Electrolyte | Polarization volts from std. $H_2$ electrode at A/ft.$^2$ | | | | | |
|---|---|---|---|---|---|---|---|---|
| | | | 0 | 1 | 4 | 10 | 25 | 75 |
| 1 molar HCHO (formaldehyde) | Platinized platinum | 30% $H_2SO_4$ T=82° C | .20 | .51 | | .59 | .62 | (¹) |
| | Platinized platinum | 30% $H_2SO_4$, 2% $Na_2MoO_4$, T=82° C. | .20 | .21 | | .29 | .39 | (¹) |
| | Pt-Au, Pressed powder electrode. | 30% $H_2SO_4$ 2% $Na_2MoO_4$ T=82° C. | .20 | .21 | .22 | .23 | .27 | .41 |
| 1 molar methanol ($CH_3OH$) | Platinized platinum | 30% $H_2SO_4$ T=82° C | .25 | .52 | .55 | .57 | .60 | |
| | Pt-Au, pressed powder electrode. | 30% $H_2SO_4$ 1% $Na_2MoO_4$ T=82° C. | .41 | .44 | .47 | .49 | .54 | |

¹ This level not attainable in this system.

What is claimed is:

1. In a fuel cell the improvement comprising in combination therewith an anode comprising an electrically conductive substrate having a physical mixture of platinum and gold thereon, said gold being about 45 to 55 wt. percent of said mixture, said electrode being immersed in an anolyte comprising aqueous sulfuric acid containing 0.1 to 2.5 wt. percent of a water soluble molybdate.

2. A fuel cell as defined by claim 1 wherein said soluble molybdate is sodium molybdate.

3. A fuel cell as defined by claim 1 wherein said minor amount is about 0.1 to 2.5 wt. percent.

4. A fuel cell as defined by claim 1 wherein said aqueous sulfuric acid has a concentration of about 25 to 45 wt. percent.

References Cited

UNITED STATES PATENTS 3,116,169  12/1963  Thompson _____ 136—120
3,239,382  3/1966  Thompson _____ 136—120
3,252,837  5/1966  Satterfield _____ 136—86

WINSTON A. DOUGLAS, *Primary Examiner.*

H. FEELEY, *Assistant Examiner.*

U.S. Cl. X.R.

136—154